Nov. 12, 1968 W. E. SOONG 3,410,031
CHUCKING APPARATUS
Filed June 29, 1966
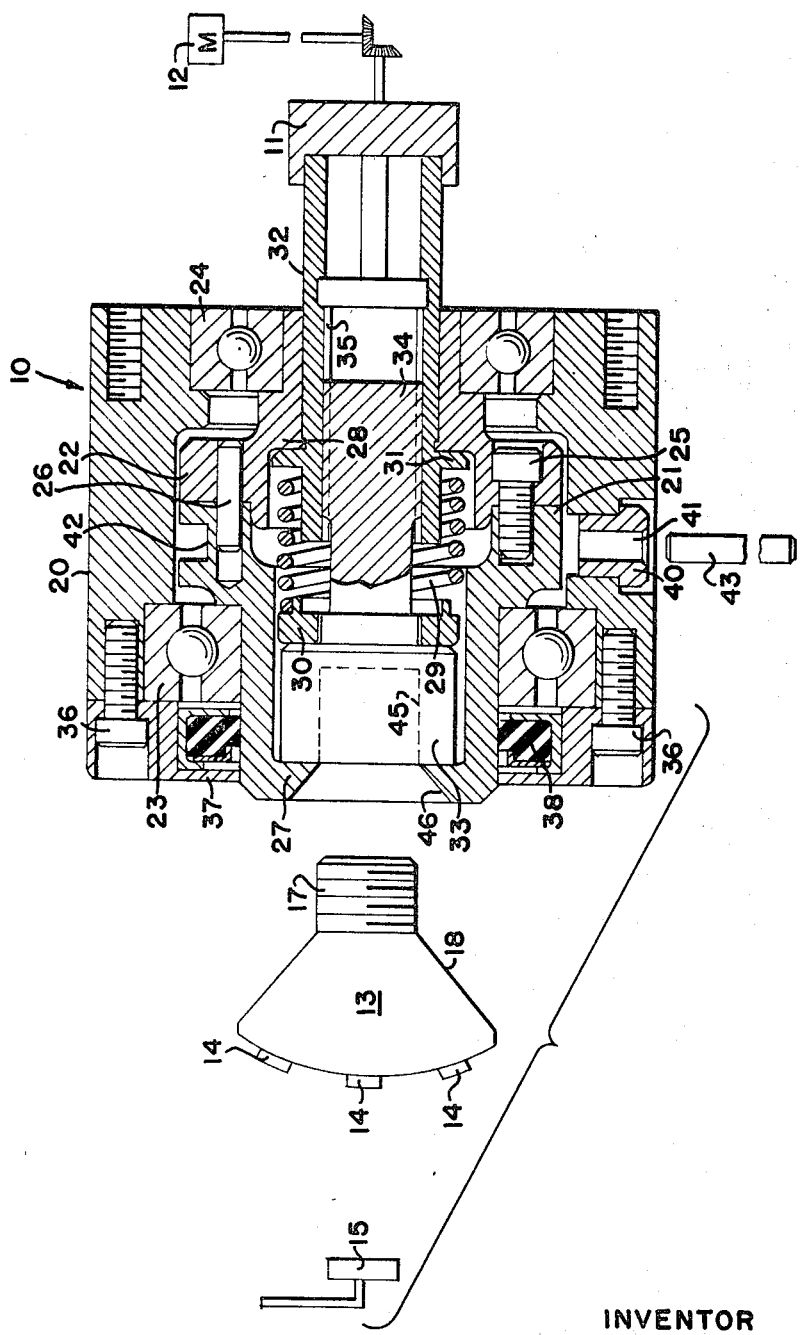
INVENTOR
WILLIAM E. SOONG
BY: Harry M. Saragovitz,
Edward J. Kelly, Herbert Berl &
S. Dubroff    ATTORNEYS.

United States Patent Office 3,410,031
Patented Nov. 12, 1968

3,410,031
CHUCKING APPARATUS
William E. Soong, Chicago, Ill., assignor, by mesne assignments, to the United States of America as represented by the Secretary of the Army
Filed June 29, 1966, Ser. No. 562,447
4 Claims. (Cl. 51—237)

ABSTRACT OF THE DISCLOSURE

A lens polishing machine having a rapid chucking and de-chucking arrangement for a work-holder which is operated by a reversible drive means. A threaded nut has an integral shank portion splined to an input spindle, though urged away therefrom by a biasing spring. An inwardly directed flange of a hollow shaft has one face normally drivingly engaged by the biased nut and another tapered surface to seat a matingly tapered portion of the work-holder. Both the hollow shaft and surrounding housing have radially alignable apertures to receive a shaft locking or stopping pin, by which work pieces can be quickly assembled or disassembled.

---

This invention relates to chucking apparatus and more particularly to chucking apparatus on a lens polishing machine.

One of the objects of the invention is to provide apparatus for chucking and dechucking work holders such as lens blocks which will substantially eliminate injuries to operators through strain or abrasion that have been a disadvantage in prior manual methods of assembling similar work pieces.

Another object of the invention is to provide such chucking apparatus that will enable assembly and disassembly of the work pieces in a minimum of time.

These and other objects, features and advantages will become apparent from the following description and accompanying drawing in which the sole figure is substantially a sectional view of the chucking apparatus for the lens block of a lens polishing machine, some of the operative elements thereof being shown schematically.

The chucking apparatus, shown generally at 10, is provided to interconnect a driving member 11, coupled by appropriate gearing to a reversible electric motor 12, with a rotatable work holder in the form of a lens block 13 that carries a plurality of lens blanks 14 to be polished by an appropriately movable tool 15. The lens block is provided with a threaded shaft 17 and conically shaped sidewall 18 for purposes to be described. It is contemplated that by use of certain design changes, the tool 15 and work holder 13 could be interchanged for certain types of operation in which the tool, rather than the work holder, is chucked for rotation.

The chucking apparatus is suitably mounted in a stationary housing 20 which is interiorly designed to house lower spindle shaft portions 21, 22 and their support bearings 23, 24. Shaft portions 21 and 22, secured upon assembly by cap screw means 25 and dowel pin 26 for unitary rotational movement, each have recessed interior surface defining inwardly extending flanges 27, 28 between which are extended, by compression spring 29 and its guide 30, the lateral flange 31 on the input spindle spline 32 and the lower spindle nut 33. The shank portion 34 of nut 33 is externally splined for reception in the mating internal spline 35 of input spindle 32. Appropriate screw means 36 secure chuck cover 37 to housing 20, with an appropriate annular seal 38 being between cover 37 and the rotary hollow shaft portion 21.

Apertured bushing 40 suitably secured to housing 20 provides a transverse opening 41 which is alignable with lateral recess 42 of shaft portion 21 such that upon proper insertion of pin member 43 in openings 41, 42 the normally rotating shaft portions 21, 22 are stopped from rotating with input shaft 32. At this moment, the coarse threads of work holder shaft 17 may be inserted to engage for securement in mating coarse-threaded recess 45 of rotating nut 33, until such time as work holder conical surface 18 engages a correspondingly conical or tapered surface 46 of forward shaft portion 21.

With the work holder 13 thus being secured in place the pin 43 is then removed so that the driving spindle 32, hollow shaft portions 21, 22 and the work holder 13 are rotated in unison, the chucking operation having been completed during continuous operation of spindle 32.

When it is desired to de-chuck the work holder the motor 12 is reversed and pin 43 again inserted in openings 41, 42 whereupon nut 33 will become disengaged from the work holder, the spring 29 being compressed sufficiently to enable such disengagement. The pin 43 is then removed, or it may be left in openings 41, 42 as the arrangement is in condition for chucking another work holder as soon as the motor is again reversed for normal operation.

Various modifications, changes or alterations may be resorted to without departing from the scope of the invention as defined in the appended claims.

I claim:
1. In a lens polishing machine having reversible drive means including an input spindle portion for imparting motion to a work-holder,
    means for chucking and de-chucking said work-holder for operation by said drive means, said chucking means comprising a threaded nut having an integral shank portion splined to said input spindle portion, a spring biasing said nut away from said input spindle portion, hollow shaft means having an inwardly directed flange at one end thereof, said flange having one face normally being engaged by said biased nut for normal rotational shaft movement therewith, said flange having another surface provided with tapered means for seating a matingly tapered portion of said work-holder, and a stationary housing substantially surrounding said shaft means, said shaft means and housing having radially alignable apertured means to receive a shaft locking pin for stopping shaft rotation.
2. The arrangement set forth in claim 1 wherein said shaft is formed of multiple sections.
3. The arrangement of claim 2 in which said shaft means has an interior recess for receiving a lateral flange on said input spindle portion.
4. The structure in accordance with claim 3 wherein one end of said housing is provided with an annular seal in engagement with said shaft.

References Cited

UNITED STATES PATENTS

| 480,979 | 8/1892 | Turner | 279—101 |
|---------|--------|--------|---------|
| 2,122,360 | 6/1938 | Sloan | 279—1 X |
| 2,501,421 | 3/1950 | Stephan | 279—1 |
| 2,895,738 | 7/1959 | Baker | 279—1 |

HAROLD D. WHITEHEAD, *Primary Examiner.*